O. RODHE.
MEANS FOR FIXING THE ZERO LINE OF GAS ANALYZING APPARATUS.
APPLICATION FILED OCT. 31, 1918.
1,316,923.
Patented Sept. 23, 1919.
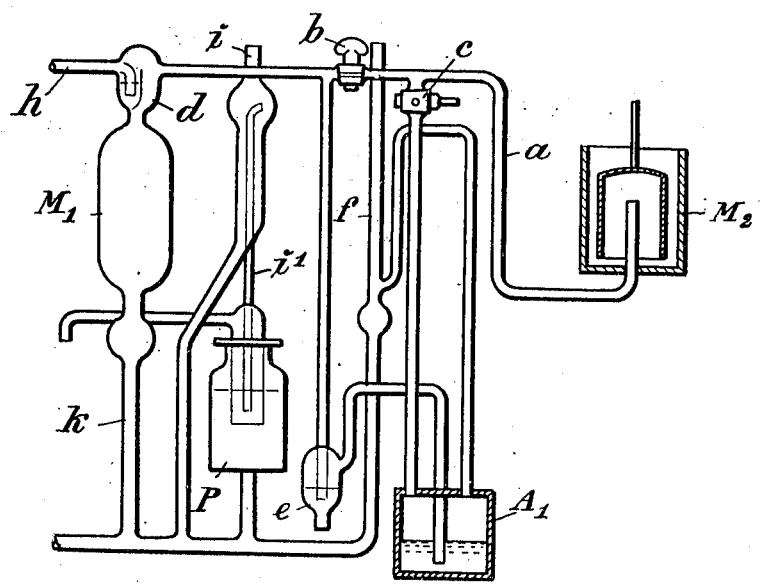
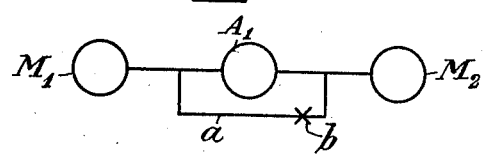
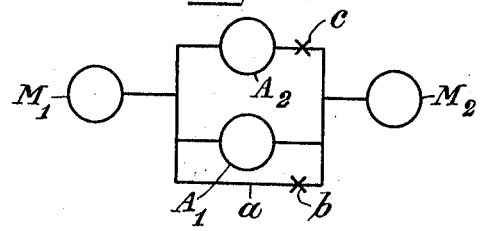
Inventor
Olof Rodhe
By Knight Bro
Attorneys

UNITED STATES PATENT OFFICE.

OLOF RODHE, OF STOCKHOLM, SWEDEN, ASSIGNOR TO SVENSKA AKTIEBOLAGET MONO., OF STOCKHOLM, SWEDEN.

MEANS FOR FIXING THE ZERO-LINE OF GAS-ANALYZING APPARATUS.

1,316,923. Specification of Letters Patent. Patented Sept. 23, 1919.

Application filed October 31, 1918. Serial No. 260,547.

*To all whom it may concern:*

Be it known that I, OLOF RODHE, chief engineer, subject of the King of Sweden, residing at 54 Odengatan, Stockholm, Sweden, have invented certain new and useful Improvements in Means for Fixing the Zero-Line of Gas-Analyzing Apparatus, of which the following is a specification.

To determine the composition of gas mixtures in gas analyzing apparatus one proceeds in the following way. First the gas analyzing apparatus is adjusted, that is to say, air or any neutral gas which is incapable of being absorbed by the absorption means is introduced in said apparatus. Then the gas analyzing apparatus should indicate that the air or the neutral gas mixture contains 0% of the gas that would be absorbed, if present. Then the apparatus is adjusted with regard to the so-called zero line. Thereby the apparatus will be ready for the analyzing of gas mixtures containing any percentage of the gas ingredient to be analyzed. Such a fixing of the zero line is very troublesome, because one has always to convince one's self that the gas to be measured in the first measuring receptacle of the apparatus is neutral and not in part mixed with gas adapted to be absorbed in the absorption receptacle. Before a reliable adjustment of the zero line can be effected, one has to convince one's self that the first measuring receptacle and the conduit leading therefrom to the absorption receptacle has been thoroughly scavenged by means of a neutral gas. Therefore, it is to be supposed that at least some of the results given by the gas analyzing apparatus, particularly in case of automatically working apparatus, are incorrect and not in correspondence with the zero line. To this is to be added that, when a neutral gas has been analyzed, the zero line has to be fixed by several consecutive analyzing operations, before the correct position of the zero line can be ascertained with perfect certainty. Another inconvenience consists in the difficulty of having neutral gas available under all circumstances, as for instance in boiler-houses or when using gas analyzing apparatus in non-neutral air and so on. A third difficulty of quite constructive nature may arise from inconvenient reversal of the gas analyzing apparatus from the analyzing position to position for fixing the zero line.

Besides, the degree of wetness is frequently different in the neutral gas mixture and the gas mixture to be analyzed, and from this difficulties with regard to the accurate fixation may easily occur.

The object of the present invention is to obviate said inconveniences, and this object is attained by providing in the gas analyzing apparatus a by-pass conduit, if necessary, equipped with shutting-off devices and enabling the current of gas, as soon as the zero line is to be fixed, to pass by the absorption receptacle direct to the second measuring receptacle.

The accompanying drawing illustrates three embodiments of the invention.

Figure 1 shows an embodiment of the invention in connection with a gas analyzing apparatus.

Figs. 2 and 3 show schematically two other embodiments of the invention.

In the embodiment according to Fig. 1 the reference letter $M_1$ indicates the first measuring receptacle in which a liquid rises and falls by means of the receptacle P that forms part of a pumping device, described in the above named British patent. The reference letters $d$ and $e$ indicate liquid seals, $f$ an ascending pipe, $A_1$ an absorption receptacle, and $h$ an inlet pipe for the gas to be analyzed. The pipings $i$ and $i_1$ are used to convey the medium that drives the pump. The liquid reaches the measuring receptacle $M_1$ through the pipe $k$. $M_2$ indicates the second measuring receptacle.

When using the apparatus for the fixation of the zero line, a by pass $a$ is, according to the invention, provided between the two measuring receptacles $M_1$ and $M_2$ and adapted to be closed or opened by means of shutting-off devices $b$.

Under normal circumstances the by pass conduit is closed and the shutting-off device $c$ inserted between the absorption receptacle $A_1$ and the second measuring receptacle $M_2$ is opened. Owing thereto, the gas mixture flows from the first measuring receptacle $M_1$ through the absorption receptacle $A_1$ to the second measuring receptacle $M_2$. If the zero line is to be fixed, the shutting-off device $b$ is opened and the shutting off device $c$ is closed, and the gas mixture, without passing through the absorption receptacle, flows through the by pass conduit $a$ direct to the second measuring receptacle $M_2$ as soon as the zero line has been fixed, the shutting-off devices $b$ and $c$ are reversed, the gax mixture then passing through the absorption receptacle.

According to the embodiment shown in Fig. 2 one shutting-off device $b$ only, namely that provided in the by pass $a$, is used. If the apparatus is to be adjusted for fixing the zero line, the shutting-off device $b$ is opened, and owing to the comparatively great fluid-resistance occurring in the absorption receptacle $A_1$, the gas mixture flows through the by pass $a$ direct to the second measuring receptacle. By reversing the shutting-off device, after the zero line has been fixed, the apparatus operates as usual.

In the embodiment shown in Fig. 3 and provided with two absorption receptacles $A_1$, $A_2$ the operation constitutes a combination of the operations of the apparatus shown in Figs. 1 and 2. If the first named apparatus is to be adjusted for the fixation of the zero line, the shutting-off device $b$ of the by pass $a$ is opened and the shutting-off device $c$ is closed, the gas mixture then passing through the by-pass $a$ direct to the second measuring receptacle $M_2$. By the resistance in the absorption receptacle $A_1$ the gas mixture is prevented from entering said receptacle. By the reversal of the shutting-off devices after the fixation of the zero line the apparatus operates as usual.

Claim:

In gas analyzing apparatus the combination with first and second measuring receptacles and an absorption receptacle, of means for fixing the zero line, comprising a by-pass for conducting the gas mixture directly from the first to the second measuring receptacle without passing through the absorption receptacle.

In testimony whereof I affix my signature in presence of two witnesses.

OLOF RODHE.

Witnesses:
JACOB BAGGE,
CHARLES H. SAFELY.